US009216732B2

(12) United States Patent
Hancock et al.

(10) Patent No.: US 9,216,732 B2
(45) Date of Patent: Dec. 22, 2015

(54) HYBRID ELECTRIC VEHICLE AND METHOD OF CONTROLLING A HYBRID ELECTRIC VEHICLE

(75) Inventors: Matthew Hancock, Whitley (GB); Jose Jimmy, Whitley (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 13/983,238

(22) PCT Filed: Jan. 31, 2012

(86) PCT No.: PCT/EP2012/051485
§ 371 (c)(1),
(2), (4) Date: Oct. 8, 2013

(87) PCT Pub. No.: WO2012/104265
PCT Pub. Date: Aug. 9, 2012

(65) Prior Publication Data
US 2014/0025244 A1   Jan. 23, 2014

(30) Foreign Application Priority Data
Feb. 1, 2011   (GB) .................................. 1101703.5

(51) Int. Cl.
*B60W 10/08* (2006.01)
*B60W 20/00* (2006.01)
*B60K 6/52* (2007.10)
(Continued)

(52) U.S. Cl.
CPC .................. *B60W 20/10* (2013.01); *B60K 6/52* (2013.01); *B60W 10/06* (2013.01); *B60W 10/08* (2013.01); *B60W 20/00* (2013.01); *B60W 50/10* (2013.01); *B60K 17/346* (2013.01); *B60W 2050/0039* (2013.01); *B60W 2050/0041* (2013.01); *B60W 2510/0638* (2013.01); *B60W 2540/10* (2013.01); *B60W 2600/00* (2013.01);
(Continued)

(58) Field of Classification Search
None
See application file for complete search history.

(56) References Cited

U.S. PATENT DOCUMENTS 5,815,824 A    9/1998  Saga et al.
5,842,534 A   12/1998  Frank
(Continued)

FOREIGN PATENT DOCUMENTS

DE   102007050230 A1   4/2009
DE   102009000706 A1   8/2010
(Continued)

OTHER PUBLICATIONS

International Search Report dated Jul. 5, 2012, International Application No. PCT/EP2011/074043; 5 pages.
(Continued)

*Primary Examiner* — John R Olszewski
*Assistant Examiner* — Jess Whittington
(74) *Attorney, Agent, or Firm* — Myers Bigel Sibley & Sajovec

(57) ABSTRACT

A hybrid electric vehicle (HEV) controller configured to determine a value of driver demanded torque to be supplied to a driveline of a HEV by first and second actuators of the vehicle based on a plurality of parameters, the parameters including: (a) a speed of a first actuator; and (b) a position of a driver-operated control, the controller being configured such that when the first actuator is not connected to the driveline a value of driver demanded torque is determined based on a virtual speed of the first actuator, the virtual speed being a speed at which the first actuator would be turning if the first actuator was connected to the driveline.

15 Claims, 2 Drawing Sheets

(51) Int. Cl.
*B60W 50/10* (2012.01)
*B60W 10/06* (2006.01)
*B60K 17/346* (2006.01)
*B60W 50/00* (2006.01)

(52) U.S. Cl.
CPC ..... *B60W 2710/105* (2013.01); *B60W 2720/30* (2013.01); *Y02T 10/6265* (2013.01); *Y10S 903/93* (2013.01)

(56) References Cited

U.S. PATENT DOCUMENTS

| | | | |
|---|---|---|---|
| 6,319,168 B1* | 11/2001 | Morris et al. | 477/5 |
| 6,336,889 B1 | 1/2002 | Oba et al. | |
| 7,766,108 B2 | 8/2010 | Rimaux et al. | |
| 8,649,924 B2* | 2/2014 | Imaseki | 701/22 |
| 2002/0029624 A1 | 3/2002 | Gassner et al. | |
| 2004/0006414 A1 | 1/2004 | Suzuki | |
| 2004/0046448 A1* | 3/2004 | Brown | 303/152 |
| 2007/0056783 A1* | 3/2007 | Joe et al. | 180/65.2 |
| 2007/0193793 A1 | 8/2007 | Burrows et al. | |
| 2007/0246554 A1 | 10/2007 | Watanabe et al. | |
| 2008/0129049 A1 | 6/2008 | Sauvlet et al. | |
| 2009/0143950 A1* | 6/2009 | Hasegawa et al. | 701/68 |
| 2009/0156355 A1 | 6/2009 | Oh et al. | |
| 2009/0321161 A1* | 12/2009 | Tang | 180/65.25 |
| 2010/0063662 A1 | 3/2010 | Harada et al. | |
| 2010/0070123 A1 | 3/2010 | Itoh et al. | |
| 2011/0287889 A1 | 11/2011 | Eisele et al. | |
| 2013/0311018 A1* | 11/2013 | Nissato | 701/22 |

FOREIGN PATENT DOCUMENTS

| | | |
|---|---|---|
| EP | 0916547 A2 | 5/1999 |
| EP | 0922600 A2 | 6/1999 |
| EP | 1925521 A2 | 5/2008 |
| EP | 1975028 A2 | 10/2008 |
| EP | 2141056 A1 | 1/2010 |
| FR | 2882698 A1 | 9/2006 |
| JP | 2005304201 A | 10/2005 |
| JP | 2007223588 A | 9/2007 |
| JP | 2008196654 A | 8/2008 |

OTHER PUBLICATIONS

International Search Report for PCT Application No. PCT/EP2012/051486 dated Jul. 4, 2012; 3 pages.

International Search Report for PCT Application No. PCT/EP2012/051487 dated Jul. 10, 2012; 4 pages.

International Search Report for PCT Application No. PCT/EP2012/051488 mailed Oct. 10, 2012; 6 pages.

Written Opinion for PCT Application No. PCT/EP2011/074043 mailed Jun. 23, 2013; 6 pages.

Dextreit, Clement; "Hybrid Electric Vehicle Controller and Mehtod of Controlling a Hybrid Electric Vehicle"; U.S. Appl. No. 13/983,230, filed Aug. 1, 2013; 42 pages.

Hancock, Matthew; "Hybrid Electric Vehicle Controller and Method of Controlling a Hybrid Electric Vehicle"; U.S. Appl. No. 13/983,235, filed Aug. 1, 2013; 28 pages.

Hancock et al., Matthew; "Hybrid Electric Vehicle Controller and Method of Controlling a Hybrid Electric Vehicle"; U.S. Appl. No. 13/983,239, filed Aug. 1, 2013; 36 pages.

Laing, Philippa; "Hybrid Electric Vehicle Controller and Method of Controlling a Hybrid Electric Vehicle"; U.S. Appl. No. 13/997,528, filed Jun. 24, 2013; 19 pages.

International Search Report for PCT Application No. PCT/EP2012/051485 dated Jul. 2, 2012; 4 pages.

* cited by examiner

HYBRID ELECTRIC VEHICLE AND METHOD OF CONTROLLING A HYBRID ELECTRIC VEHICLE

CROSS REFERENCE TO RELATED APPLICATIONS

This application is a National Phase Application of Patent Application PCT/EP2012/051485 filed on 31 Jan. 2012, which claims priority to GB1101703.5, filed 1 Feb. 2011, of which both applications are incorporated by reference herein in their entirety.

FIELD OF THE INVENTION

The present invention relates to a controller for a hybrid electric vehicle, to a hybrid electric vehicle and to a method of controlling a hybrid electric vehicle (HEV). In particular but not exclusively the invention relates to a controller for a parallel-type hybrid electric vehicle, to a parallel-type hybrid electric vehicle and to a method of controlling a parallel-type HEV during a transition from an electric vehicle (EV) mode of operation to a parallel mode.

BACKGROUND

It is known to provide a parallel-type hybrid electric vehicle (HEV) having an electric machine and an internal combustion engine connected in parallel to a driveline of the vehicle.

The vehicle may be operated in an electric vehicle (EV) mode in which torque to the driveline is provided exclusively by the electric machine. Alternatively the vehicle may be operated in a parallel mode in which torque is provided to the driveline by the and electric machine.

In some known non-HEV vehicles have only an engine, a controller of the vehicle is configured to determine a value of torque being demanded by the driver of the vehicle from the engine ('driver demanded torque') based on instantaneous values of engine speed and position of the accelerator pedal. It is to be understood that in the case of a HEV, when the HEV is operating in EV mode the engine speed will be zero. Thus a conventional controller would be unable to determine correctly a value of driver demanded torque.

STATEMENT OF THE INVENTION

Embodiments of the invention may be understood by reference to the appended claims.

Aspects of the invention provide a controller, a motor vehicle and a method as claimed in the appended claims.

In another aspect of the invention for which protection is sought there is provided a hybrid electric vehicle (HEV) controller configured to determine a value of driver demanded torque to be supplied to a driveline of a HEV by first and second actuators of the vehicle based on a plurality of parameters, the parameters including:
(a) a speed of a first actuator; and
(b) a position of a driver-operated control,
the controller being configured such that when the first actuator is not connected to the driveline a value of driver demanded torque is determined based on a virtual speed of the first actuator and the position of the driver-operated control, the virtual speed of the first actuator being a speed at which the first actuator would be turning if the first actuator was connected to the driveline.

This has the advantage that control algorithms developed to calculate driver demanded torque based on the first actuator speed may continue to be employed even when the first actuator is not operating. This has the advantage that the vehicle will respond to control inputs from the driver in a manner that is independent of which one of the first and second actuators is operating. This in turn has the advantage that a difference in handling and performance of the vehicle between a mode in which the first actuator is connected to the driveline and a mode in which the first actuator is disconnected from the driveline may be reduced.

It is to be understood that a key concern of a designer of a parallel HEV is the achievement of a relatively seamless transition between EV and parallel modes. Embodiments of the present invention allow an improvement in HEV control by reducing a perceived difference in performance characteristics between the EV mode of operation and the parallel mode of operation. This has the advantage that a driver's enjoyment of the vehicle may be enhanced.

In some embodiments the position of the driver-operated control may be controlled by means of an electronic controller of the vehicle. The electronic controller may be arranged to receive control signals from a remote operator being a person or a machine, for example by means of a wireless communications device such as a radio communications device, an optical communications device or any other suitable device.

Other arrangements are also useful.

The controller may be arranged to determine the virtual speed of the first actuator based on a speed of the second actuator.

In an embodiment the controller is arranged to determine the virtual speed of the first actuator based on a measured speed of the second actuator.

Measurement of the actual speed of the second actuator may be accomplished reliably in a number of ways, for example by means of a speed sensor. Thus this feature has the advantage that determination of driver demanded torque may be made based on a measurement that may be reliably made.

Alternatively the controller may be arranged to determine the virtual speed of the first actuator based on a calculated speed of the second actuator, the calculated speed being calculated based on a currently demanded speed of the second actuator.

Thus the controller may be arranged to employ a value of a parameter to which the speed of the second actuator is responsive.

The controller may be arranged to determine the virtual speed of the first actuator taking into account a gear ratio between the first actuator and the second actuator that would be experienced by the first actuator if the first actuator were connected to the driveline.

Thus the gear ratio is determined between the first actuator and the second actuator that would exist if the first actuator were connected to the driveline.

Alternatively or in addition the controller may be arranged to determine the virtual speed of the first actuator based on a speed of the driveline at a speed measurement position of the driveline.

The controller may be configured to determine the virtual speed of the first actuator based on a gear ratio between the first actuator and the speed measurement position of the driveline that would be experienced by the first actuator if the first actuator were connected to the driveline.

Thus the gear ratio is determined between the first actuator and the speed measurement position of the driveline that would exist if the first actuator were connected to the driveline.

Alternatively or in addition the controller may be arranged to determine the virtual speed of the first actuator based on a wheel speed.

In an embodiment the controller is operable when the first actuator is not connected to the driveline to estimate an amount of braking torque that would be provided to the driveline by the first actuator if the first actuator were connected to the driveline in dependence on at least the virtual speed of the first actuator, the controller being further operable to control the at least a second actuator to deliver an amount of torque to the driveline corresponding to a net torque that would be delivered to the driveline if the first actuator were connected to the driveline.

The estimation may be made for example by reference to a look-up table or the like.

It is to be understood that if, when the vehicle is driven with the first actuator connected to the driveline, a driver reduces an amount of driver demanded torque, for example by releasing an accelerator pedal, the first actuator may apply a negative torque to the driveline. In the case where the first actuator is an internal combustion engine this negative torque may be referred to as 'engine braking' or 'compression braking'.

When a hybrid vehicle with an internal combustion engine is driven with the engine disconnected from the driveline (disconnection typically being made by means of a clutch), the engine is unable to provide a braking action. Accordingly, a driver may notice a difference in vehicle handling when the vehicle is moving and an accelerator pedal is released depending on whether the vehicle is in an electric vehicle mode or a parallel mode.

In order to overcome this problem, a controller according to an embodiment of the present invention is configured to determine the amount of negative torque that would be applied to the driveline by the engine if it was connected to the driveline, and to control the amount of torque applied by the remaining one or more actuators (i.e. the at least a second actuator) to compensate for the fact that the engine is disconnected and provide a net torque to the driveline that corresponds to that which would be provided if the first actuator was connected to the driveline. It is to be understood that in some common situations the at least a second actuator may be arranged to apply a negative torque to the driveline corresponding to the negative torque that would be applied by the first actuator (such as an engine) if it were connected to the driveline, It is to be understood that the amount of negative torque that would be applied by the first actuator may be dependent on the speed at which the first actuator is rotating. Accordingly, the controller is configured to determine the amount of negative torque that would be developed by the first actuator if it was rotating at the virtual speed of the first actuator determined by the controller.

It is to be understood that some embodiments of the invention have the advantage that if the first actuator is not connected to the driveline, a net torque applied to the driveline by the at least a second actuator may be controlled so as to correspond to a net torque that would be applied to the driveline by the first and at least a second actuator if the first actuator was in fact connected to the driveline. Thus a driver may enjoy a consistent driving experience irrespective of whether or not the first actuator is connected to the driveline.

Further advantageously the controller is operable to estimate the amount of braking torque that would be provided to the driveline by the first actuator in further dependence on at least one selected from amongst the position of the driver-operated control, the speed of the vehicle and a gear ratio between a wheel of the vehicle and the first actuator.

The vehicle speed may correspond to a wheel speed.

In an embodiment the controller is operable when the first actuator is not connected to the driveline to determine an amount of torque that would be available from the first actuator if the first actuator was connected to the driveline in dependence on the virtual speed of the first actuator.

Further advantageously the controller is operable to determine whether or not it is required to start the first actuator in dependence on the position of the driver-operated accelerator control and the amount of torque that would be available from the first actuator if the first actuator were connected to the driveline.

It is to be understood that an estimate of the maximum amount of torque that would be available from the first actuator (such as an internal combustion engine) when the first actuator is in fact not connected to the driveline (and may be in an off state) is required by the controller in order to saturate to a reasonable value the value of driver demanded torque determined by the controller. Driver demanded torque is determined by the controller responsive to the position of the driver-operated accelerator control and the calculated virtual speed of the first actuator as described above.

In some embodiments the controller is arranged to set a maximum value of torque that a driver may demand (for example by fully depressing an accelerator pedal or other control) to be equal to the maximum torque that may be generated by the first actuator and at least a second actuator combined. In the case that the first actuator is switched off, the controller uses the value of the virtual speed of the first actuator determined by the controller to calculate the maximum amount of torque that the first actuator could develop if it were switched on and connected to the driveline. This is because in some embodiments (such as those in which the first actuator is provided by an internal combustion engine) the amount of torque that may be provided by the first actuator may be dependent on a speed at which the first actuator is rotating.

Thus the controller is operable to determine a reasonable value of maximum torque that a driver may demand regardless of whether the first actuator is switched on and connected to the driveline.

The controller monitors the value of driver demanded torque (by monitoring the position of the driver-operated accelerator control). If the controller determines that the amount of torque demanded by the driver cannot be met by the vehicle at a given moment in time, the controller is arranged to determine whether it is necessary to start the first actuator and connect it to the driveline in order to meet the value of driver demanded torque.

If the vehicle determines that the value of driver demanded torque is such that the first actuator should be started, the controller is arranged to command starting of the first actuator. The controller is operable also to determine the amount of torque to be provided by each actuator. The amount of torque to be provided by each actuator (also referred to as the torque split between the actuators) may be determined using the knowledge of the maximum torque that can be developed by the first actuator at the virtual actuator speed.

The actuator torque split may be determined by the controller in order to obtain an optimum trade-off between vehicle drivability and reduced environmental emissions or fuel economy. Other arrangements are also useful.

In a further aspect of the invention for which protection is sought there is provided a hybrid electric vehicle (HEV) comprising a controller according to the preceding aspect.

In an embodiment the first actuator comprises an internal combustion engine.

Further advantageously the second actuator comprises an electric machine.

The electric machine may comprise an electric motor/generator arranged to be operated as a motor or as a generator.

The second actuator may comprise a crankshaft-integrated motor/generator (CIMG).

The first actuator may be coupled to the driveline via the second actuator.

Alternatively the second actuator may be comprised in a rear axle drive (RAD) unit.

The RAD unit may be provided between a gearbox or transmission of the driveline and at least one wheel of the vehicle driven by the RAD unit.

In a still further aspect of the invention for which protection is sought there is provided a method of controlling a hybrid electric vehicle (HEV) comprising the step of determining a value of driver demanded torque to be supplied to a driveline of a HEV by first and second actuators of the vehicle based on a plurality of parameters, the parameters including:
 (a) a speed of a first actuator; and
 (b) a position of a driver-operated control,
 when the first actuator is not connected to the driveline the method comprising determining a value of driver demanded torque based on a virtual speed of the first actuator and the position of the driver-operated control, the virtual speed being a speed at which the first actuator would be turning if the first actuator was connected to the driveline.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
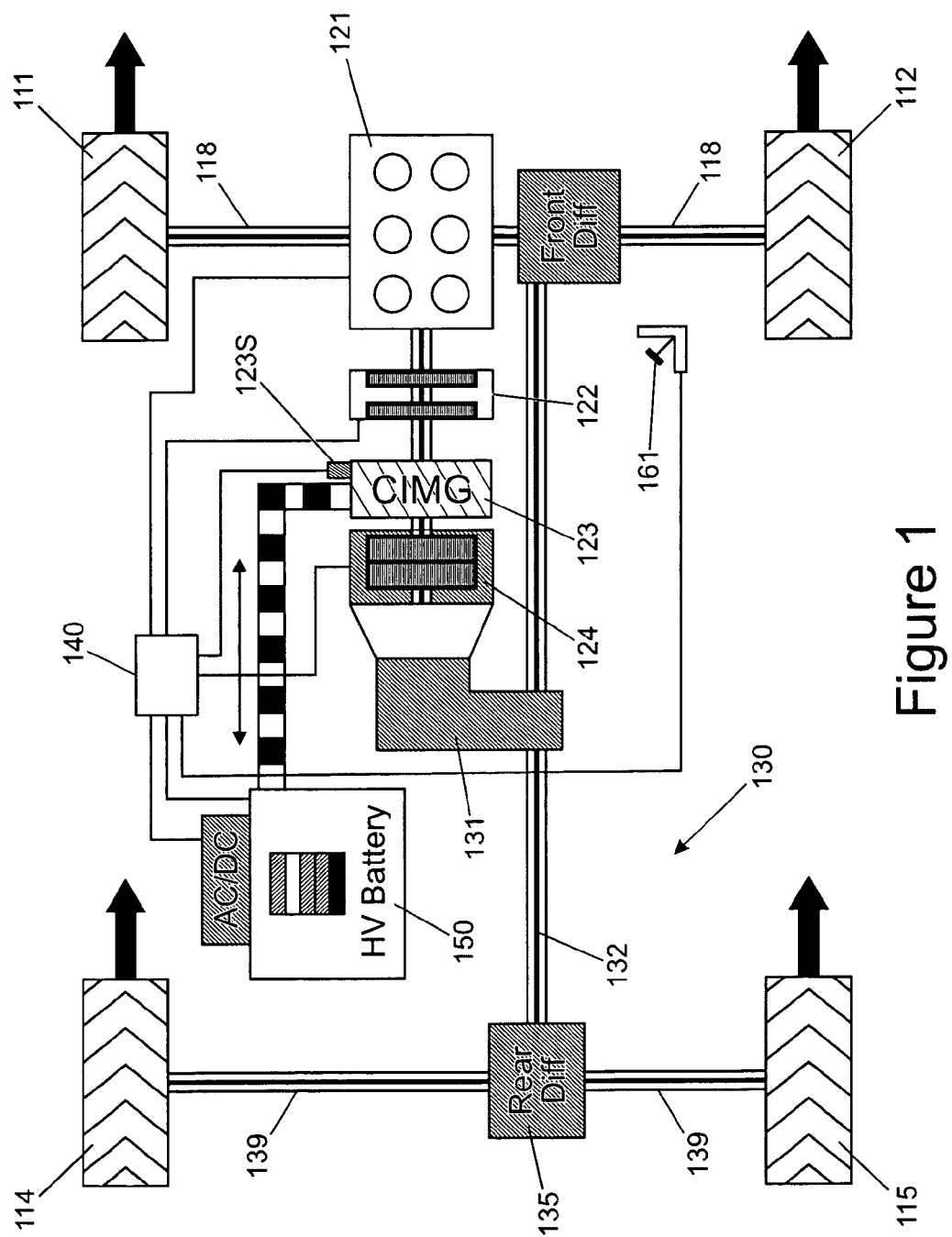
FIG. 1 is a schematic illustration of a hybrid electric vehicle according to a first embodiment of the invention.

In one embodiment of the invention a parallel-type hybrid electric vehicle (HEV) 100 is provided as shown in FIG. 1. The vehicle 100 has an internal combustion engine 121 releasably coupled to a crankshaft integrated motor/generator (CIMG) 123 by means of a clutch 122. The CIMG 123 is in turn coupled to an automatic transmission 124.

The transmission 124 is arranged to drive a pair of front wheels 111, 112 of the vehicle 100 by means of a pair of front drive shafts 118. The transmission 124 is also arranged to drive a pair of rear wheels 114, 115 by means of an auxiliary driveline 130 having an auxiliary driveshaft 132, a rear differential 135 and a pair of rear driveshafts 139.

A battery 150 is provided that may be coupled to the CIMG 123 in order to power the CIMG 123 when it is operated as a motor. Alternatively the battery 150 may be coupled to the CIMG 123 to receive charge when the CIMG 123 is operated as a generator, thereby to recharge the battery 150.

The vehicle 100 is configured to operate in either one of a parallel mode and an electric vehicle (EV) mode.

In the parallel mode of operation the clutch 122 is closed and the engine 121 is arranged to provide torque to the transmission 124. In this mode the CIMG 123 may be operated either as a motor or as a generator.

In the EV mode of operation the clutch 122 is open and the engine 121 is turned off. Again, the CIMG 123 is then operated either as a motor or as a generator. It is to be understood that the CIMG 123 may be arranged to act as a generator in EV mode in order to effect regenerative braking of the vehicle.

The vehicle 100 has a controller 140 arranged to control the vehicle 100 to transition between the parallel and EV modes depending on one or more of a variety of parameters associated with the vehicle and driver actions that will not be discussed herein.

When the vehicle 100 is in the parallel mode of operation with the engine 121 switched on the vehicle 100 is arranged to determine a value of driver demanded torque based on a speed of rotation of the engine 121 and a position of an accelerator (or throttle) pedal 161 of the vehicle 100. Values corresponding to the engine speed and pedal position are fed to the controller 140. A value of driver demanded torque $TQ_d$ is determined by the controller 140 by reference to a 2D map of driver demanded torque $TQ_d$ as a function of engine speed and pedal position.

It is to be understood that by driver demanded torque is meant an amount of torque being demanded by the driver to be provided to the wheels 111, 112, 114, 115 of the vehicle 100.

It is to be understood that when the vehicle 100 is operating in EV mode the engine 121 is typically switched off and therefore the controller 140 is unable to calculate a value of $TQ_d$ based on engine speed and accelerator pedal position.

Thus, when the engine 121 is switched off the controller 140 is arranged to determine a virtual speed of the engine 121 being a speed at which the engine 121 would be rotating if the engine 121 were switched on and connected to the CIMG 123.

It is to be understood that in the embodiment of FIG. 1 when the engine 121 is connected to the CIMG 123 via the clutch 122 the speed of the CIMG 123 is substantially equal to that of the engine 121. Thus in the embodiment of FIG. 1 when the vehicle 100 is in EV mode the controller 140 is arranged to determine the value of $TQ_d$ by providing to the 2D map a value corresponding to the CIMG speed 123 instead of the speed of the engine 121.

In the embodiment of FIG. 1 the controller 140 is arranged to determine CIMG speed by reference to a speed measuring device 123S coupled to the CIMG 123. The speed measuring device 123S is therefore arranged to provide an input to the controller 140.

In some alternative embodiments the controller 140 is arranged to determine CIMG speed by reference to an electrical measurement in respect of the CIMG 123. In some embodiments CIMG speed may be determined based on a value of CIMG speed demanded by the controller 140 or an associated control device or module.

It is to be understood that in some embodiments, instead of an accelerator pedal 161 an alternative actuator or control may be provided such as a manually operated lever, a joystick or the like.

In some embodiments the position of the accelerator pedal 161 or other control may be controlled by means of an electronic controller of the vehicle 100. The electronic controller may be arranged to receive control signals from a remote operator being a person or a machine, for example by means of a wireless communications device such as a radio communications device, an optical communications device or any other suitable device.

Other arrangements are also useful.

Figure 2:
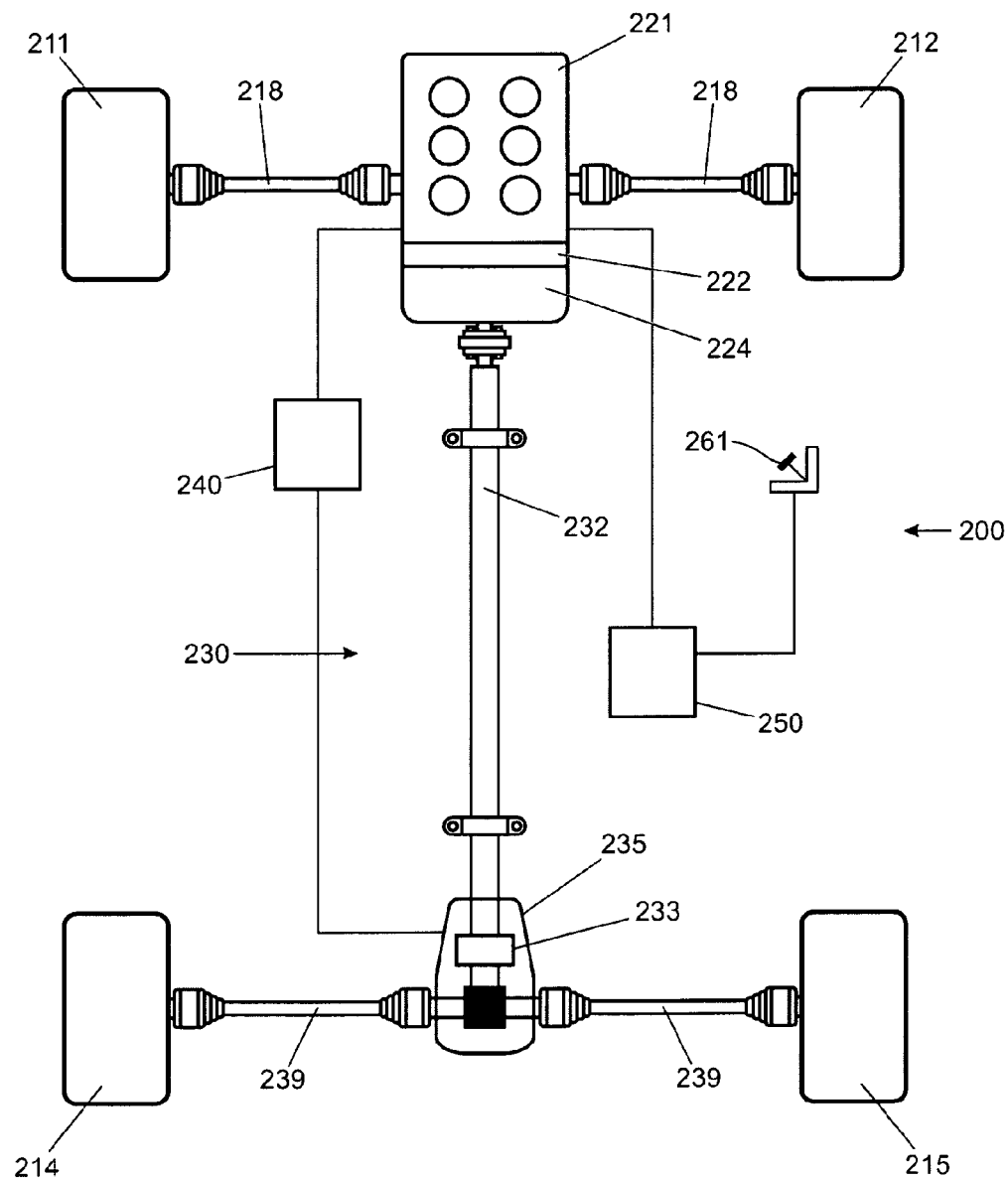
FIG. 2 is a schematic illustration of a hybrid electric vehicle according to a second embodiment of the invention.

FIG. 2 shows a hybrid electric vehicle 200 according to a further embodiment of the invention. Like features of the embodiment of FIG. 2 to those of the embodiment of FIG. 1 are provided with like reference signs prefixed numeral 2 instead of numeral 1.

The embodiment of FIG. 2 differs from that of FIG. 1 primarily in that it does not have a CIMG 123. Rather, the vehicle 200 has an electric machine 233 integrated into a rear axle drive unit 235 of the auxiliary driveline 230, which will be referred to herein as an electric rear axle drive unit (ERAD) 235. A battery 250 is provided to power the electric machine 233 of the ERAD 235.

The ERAD 235 is operable as a motor to provide torque to the auxiliary driveline 230. The ERAD 235 is also operable as a generator to generate power to recharge the battery 250 by applying a negative torque to the auxiliary driveline 230. Negative torque may be applied for example when the vehicle 200 is in motion and positive torque is provided by the engine 221 or in a regenerative braking operation when it is required to decelerate the vehicle 200.

The engine 221 of the vehicle 200 is coupled directly to the automatic transmission 224 by means of a clutch 222. The transmission 224 is in turn coupled to the front wheels 211, 212 of the vehicle 200 by means of front drive shafts 218. The transmission 224 is coupled to the rear wheels 214, 215 by means of the auxiliary driveline 230.

It is to be understood that the vehicle 200 may be operated in a parallel mode or an EV mode as in the case of the vehicle 100 of FIG. 1.

In the parallel mode of operation the clutch 221 is closed and the engine 221 and ERAD 235 are both operable to provide torque to the auxiliary driveline 230 and front driveshafts 218.

In the EV mode of operation the clutch 222 is opened to disconnect the engine 221 from the transmission 224. In this mode the ERAD 235 alone is employed to provide torque (positive or negative) to the auxiliary driveline 230 and in turn to the front driveshafts 218. Thus the ERAD 235 is able to provide torque to all four wheels 211, 212, 214, 215 of the vehicle.

It is to be understood that other arrangements are also useful. For example, in some embodiments the vehicle 200 may be provided with a power transfer unit (PTU) between the transmission 224 and auxiliary driveline 230. The PTU may be operable releasably to couple the auxiliary driveline 230 to the transmission 224.

Thus the engine 221 may be employed to drive either only the front wheels 211, 212 or both the front wheels and the rear wheels 211, 212, 214, 215. Similarly the ERAD 235 may be employed to drive only the rear wheels 214, 215 or both the front wheels and the rear wheels 211, 212, 214, 215.

When the vehicle 100 is operating in the parallel mode the controller 240 is arranged to determine the value of driver demanded torque $TQ_d$ for the vehicle 200 by reference to the speed of rotation of the engine 211 and the position of the accelerator pedal 261 in a similar manner to the embodiment of FIG. 1.

It is to be understood that when the engine 221 is turned off and the vehicle is driven by the ERAD 235 alone the controller 240 is unable to determine the correct value of $TQ_d$ by reference to engine speed and accelerator pedal position.

Thus, the controller 240 is arranged to determine the value of $TQ_d$ by reference to a virtual speed of the engine 211 and the accelerator pedal position.

It is to be understood that unlike the embodiment of FIG. 1, in the embodiment of FIG. 2 the electric machine 233 and engine 211 do not necessarily rotate at the same speed when the vehicle is in the parallel mode. This is because the transmission 224 is provided between the electric machine 233 of the ERAD 235 and the engine 221.

Thus, in the parallel mode the relative speeds of rotation of the engine 211 and ERAD 235 will depend on the selected gear of the transmission 224. The controller is therefore arranged to determine the virtual engine speed based on the currently selected gear ratio between the clutch 222 and ERAD 235, the controller 240 being provided with an input corresponding to the currently selected gear ratio.

Embodiments of the present invention have the advantage that algorithms employed to determine $TQ_d$ based on engine speed may be employed whether a HEV is operating in a parallel mode or an EV mode. This has the advantage that a difference in handling characteristics of a HEV when operated in parallel mode compared with those in EV mode may be reduced.

Some embodiments have the advantage that a complexity of a controller of a HEV may be reduced. This has the advantage that a cost of the controller may be reduced.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a hybrid electric vehicle (HEV), the controller configured to determine a value of driver demanded torque to be supplied to a driveline of a vehicle by a first and second actuator of the vehicle based on a plurality of parameters, the plurality of parameters including:
   (a) a speed of the first actuator; and
   (b) a position of a driver-operated accelerator control,
   the controller configured such that, when the first actuator is not connected to the driveline, a value of driver demanded torque is determined based on a virtual speed of the first actuator and the position of the driver-operated accelerator control, the virtual speed of the first actuator being a speed at which the first actuator would be turning if the first actuator was connected to the driveline;

the controller configured to determine the virtual speed of the first actuator based on one selected from amongst a measured speed of the second actuator and a calculated speed of the second actuator, the calculated speed being calculated based on a currently demanded speed of the second actuator; and the controller configured to control the second actuator to deliver an amount of torque to the driveline that corresponds to the determined driver demanded torque.

2. A controller as claimed in claim 1 arranged to determine the virtual speed of the first actuator taking into account a gear ratio between the first actuator and the second actuator that would be experienced by the first actuator if the first actuator were connected to the driveline.

3. A controller as claimed in claim 1 arranged to determine the virtual speed of the first actuator based on one selected from amongst a speed of the driveline at a speed measurement position of the driveline, a wheel speed, and a gear ratio between the first actuator and the speed measurement position of the driveline.

4. A controller as claimed in claim 1 configured such that, when the first actuator is not connected to the driveline, an amount of braking torque that would be provided to the driveline by the first actuator if the first actuator were connected to the driveline is estimated in dependence on at least the virtual speed of the first actuator, the controller being further operable to control the second actuator to deliver an amount of torque to the driveline corresponding to a net torque that would be delivered if the first actuator were connected to the driveline.

5. A controller as claimed in claim 4 operable to estimate the amount of braking torque that would be further provided in further dependence on at least one selected from amongst the position of the driver-operated accelerator control, the speed of the vehicle and a gear ratio between a wheel of the vehicle and the first actuator.

6. A controller as claimed in claim 1 configured such that, when the first actuator is not connected to the driveline, a maximum amount of torque that would be available from the first actuator if the first actuator was connected to the driveline is determined in dependence on the virtual speed of the first actuator.

7. A controller as claimed in claim 6 operable to determine whether or not it is required to start the first actuator in dependence on the position of the driver-operated accelerator control and the maximum amount of torque that would be available from the first actuator if the first actuator were connected to the driveline.

8. A hybrid electric vehicle (HEV) comprising a controller as claimed in claim 1.

9. A vehicle as claimed in claim 8 wherein the first actuator comprises an internal combustion engine and the second actuator comprises an electric machine.

10. A controller as claimed in claim 9 wherein the electric machine comprises an electric motor/generator arranged to be operated as a motor or as a generator.

11. A vehicle as claimed in claim 8 wherein the first actuator is arranged to be coupled to the driveline via the second actuator.

12. A vehicle as claimed in claim 8 wherein the second actuator is comprised in a rear axle drive (RAD) unit.

13. A vehicle as claimed in claim 12 wherein the RAD unit is provided between a gearbox or transmission of the driveline and at least one wheel of the vehicle driven by the RAD unit.

14. A method of controlling a hybrid electric vehicle (HEV) comprising:
  determining a value of driver demanded torque to be supplied to a driveline of the vehicle by a first and second actuator of the vehicle based on a plurality of parameters, the parameters including:
    (a) a speed of the first actuator; and
    (b) a position of a driver-operated control;
  when the first actuator is not connected to the driveline, determining a value of driver demanded torque based on a virtual speed of the first actuator and the position of the driver-operated control, the virtual speed of the first actuator being a speed at which the first actuator would be turning if the first actuator was connected to the driveline;
  determining the virtual speed of the first actuator based on one selected from amongst a measured speed of the second actuator and a calculated speed of the second actuator, the calculated speed being calculated based on a currently demanded speed of the second actuator; and
  controlling the second actuator to deliver an amount of torque to the driveline that corresponds to the determined driver demanded torque.

15. A controller as claimed in claim 10, wherein the second actuator comprises a crankshaft-integrated motor/generator (CIMG).

* * * * *